United States Patent [19]

Broermann

[11] Patent Number: 4,666,752

[45] Date of Patent: May 19, 1987

[54] DRAFTING PAPER

[75] Inventor: Theodor Broermann, Adelsheim, Fed. Rep. of Germany

[73] Assignee: Firma R. Broermann, Adelsheim, Fed. Rep. of Germany

[21] Appl. No.: 752,921

[22] Filed: Jul. 8, 1985

[30] Foreign Application Priority Data

Jul. 7, 1984 [DE] Fed. Rep. of Germany ... 8420427[U]

[51] Int. Cl.[4] ........................... B32B 3/02; B32B 3/10

[52] U.S. Cl. ...................................... 428/43; 428/137; 428/194; 428/157; 428/211; 428/906; 282/12 A; 281/5

[58] Field of Search ................. 428/43, 137, 194, 211, 428/157, 167, 906; 282/12 A, 12 R; 281/5

[56] References Cited

U.S. PATENT DOCUMENTS 4,551,374 11/1985 Holmberg ....................... 428/194 X

*Primary Examiner*—Alexander S. Thomas

*Attorney, Agent, or Firm*—Herbert L. Lerner; Laurence A. Greenberg

[57] ABSTRACT

An opaque or transparent drafting paper assembly includes a drafting paper sheet having edges, the paper sheet having holes formed in a given region thereof for hanging the paper sheet in a hanging file system, and at least one synthetic foil strip applied on the paper sheet by a formed lamination process, the foil strip covering at least the given region of the paper sheet and reinforcing at least one of the edges thereof.

5 Claims, 4 Drawing Figures

DRAFTING PAPER

The invention relates to opaque or transparent drafting or drawing paper, wherein at least one edge thereof is reinforced with a synthetic foil strip having holes formed therein for hanging the drafting paper in a hanging file system.

Drafting papers of this type have heretofore been provided at the upper edge thereof with a carrier band having an adhesive zone and holes for hanging the papers into a filing device, so that they can be stored in a filing system. The reinforcement at the upper edge of the drafting paper with a carrier or support band is necessary because the drafting paper does not have sufficient strength and the holes would otherwise tear almost immediately. The disadvantage of this practice lies in the fact that the support band is glued by hand onto the sheet of drafting paper after the drawing has been finished. As is well known, it is quite difficult to manually cement an adhesive band having a great length to a paper sheet without allowing any angular deviation and keeping it perfectly flat. The smallest angular deviations between the band and the sheet over long distances are sufficient to cause the sheet to stick out considerably from its vertical alignment when storing it into a hanging file system, so that a disorderly appearance results in a file system, wherein several sheets of this type are stored. Additionally, if the band is not perfectly uniformly cemented, waves are formed in the paper sheet, which are especially undesirable in drafting paper sheets. Finally, experience has shown that the adhesive zones of the support bands considerably increase the thickness of the drafting paper sheets which are to be stored in the file system, so that the space available in the file system is not economically utilized.

It is also known to produce edge reinforcements for paper sheets by fusing a plastic strip onto the sheet. However, this technique also causes an undesirable increase of the thickness of the sheet in the bonding zones.

It is accordingly an object of the invention to provide a drafting paper which overcomes the hereinafore-mentioned disadvantages of the heretofore-known devices of this general type, and to finish paper for vertical file systems in such a way that they can be stored in archives without the conventional support bands, which have the above-mentioned disadvantages.

With the foregoing and other objects in view there is provided, in accordance with the invention, an opaque or transparent drafting or drawing paper assembly, comprising a drafting or drawing paper sheet having edges, the paper sheet having holes formed in a given region thereof for hanging the paper sheet in a hanging file system, and at least one synthetic or plastic foil strip applied or laminated on the paper sheet by a formed, shaped or profiled lamination process, the foil strip covering at least the given region of the paper sheet and reinforcing at least one of the edges thereof.

The formed, shaped or profiled lamination of the drawing paper with synthetic or plastic strips is performed by the manufacturer and forms a considerably better adhesive connection between the paper sheet and the strip, while adding considerably less to the thickness thereof than the prior art adhesive layers or fusion seams. Furthermore, all manipulations of the drawing paper after finishing the drawing are avoided, so that there is no danger that the often costly and time-consuming making of the drawing would have to be repeated due to possible damage to the drawing caused by manipulation of the drawing sheet.

In accordance with another feature of the invention, the foil strip has expansion joints formed therein. The joints are preferably creased or scratched into the strip It is known that drawing papers expand and contract greatly in dependence on humidity and temperature. In order to avoid warping between the paper sheet and the plastic foil strip due to these expansions and contractions, the expansion joints absorb these relative motions.

In accordance with a further feature of the invention, the holes are disposed in a pattern fitting particular hanging mechanisms.

In accordance with an added feature of the invention, the edges of the paper sheet are i.n the form of two opposite lateral edges, an upper edge and a lower edge, and the at least one foil strip is in the form of two or three foil strips applied at the lateral and preferably at the lower edges of the paper sheet by form lamination.

In accordance with an additional feature of the invention, the paper sheet and the foil strips at the lateral edges have transport holes stamped therein for a plotter system.

In accordance with again another feature of the invention, the foil strip has a region thereon for writing or for indicating filing data.

In accordance with again a further feature of the invention, the paper sheet is part of a paper roll.

In accordance with again an added feature of the invention, the paper roll has perforations formed therein subdividing the roll into individual sheets.

In accordance with a concomitant feature of the invention, the foil strip is formed of a material from the group consisting of acetate, polyethylene, polyamide, polycarbonate, polyester, polyfluorethylene, polypropylene and polyvinylchloride.

Other features which are considered as characteristic for the invention are set forth in the appended claims.

Although the invention is illustrated and described herein as embodied in a drafting paper, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
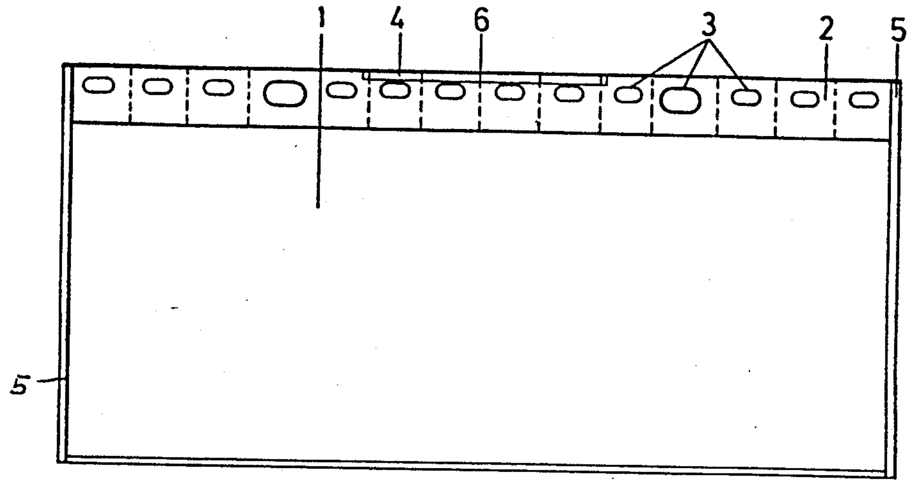
FIG. 1 is a diagrammatic top-plan view of a drafting paper sheet with a plastic foil strip laminated thereon.

Referring now to the figures of the drawing in detail and first, particularly, to FIG. 1 thereof, there is seen a drafting or drawing paper 1 which is made in standard sizes. The edges of the paper are reinforced by synthetic or plastic foil strips 2, 5, respectively, which are applied by formed, shaped or profiled lamination. The edge reinforcements thus obtained prevent the tearing of thedrawing paper. The wide plastic foil strip 2 is provided with holes 3 for hanging the drawing paper 1 into a hanging file system. The pattern of the holes is therefore chosen in such a way that they are suitable for different hanging file systems.

The plastic foil strip 2 is provided in its upper middle region with a space 4, which preferably contains information about the finished drawing.

Finally, the plastic foil strip 2 is provided with a number of expansion joints 6, which prevent possible stretching of the drawing paper 1 due to humidity and temperature changes and thereby prevent an undesired warping of the drafting or drawing paper.

In the illustrated embodiment, which was used as an example, the wide plastic foil strip 2 extends over the entire length of the drafting paper 1. However, it is also possible to provide the holes 3 for hanging the drawing paper 1 only in a partial region of the sheet and to laminate only this partial region with the plastic foil strip. On the other hand, as already mentioned above, since the plastic strip 2 is also meant to prevent the tearing of the drawing paper 1, it is practical to laminate the plastic foil strip over the entire length of the sheet.

The formed, shaped or profiled lamination of the plastic foil strips 2 and 5 to the drafting paper 1 is done by the manufacturer under high pressure with a machine, so that there is no increase worth mentioning of the thickness of the drafting paper 1 in the region where the very thin plastic foil strips are laminated. Due to the considerably thinner foil strip union as compared to the prior art cemented or fused edge reinforcements, the capacity of the hanging file system for holding drawing sheets is considerably improved Furthermore, the support band is not in the way on a drawing board, or in a copying machine. The manual application of the support band is omitted.

Figure 2:
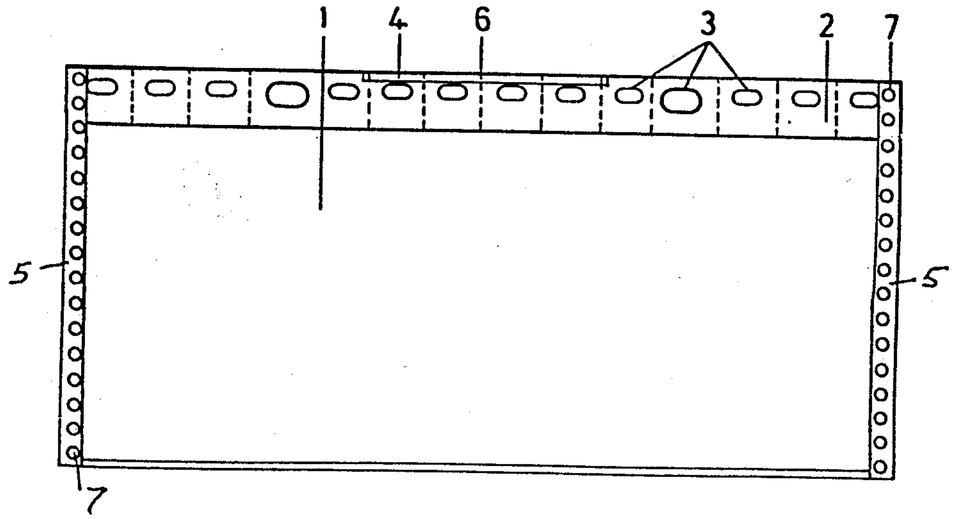
FIG. 2 is a top-plan view of the drafting paper sheet according to FIG. 1, wherein the lateral edges are also provided with a plastic foil strip.

In the embodiments described below, the parts which are the same or which have the same function are designated with the same reference symbols as in the first embodiment. The drafting or drawing sheet 1 according to FIG. 2 differs from the sheet in FIG. 1 only through the use of wider synthetic or plastic foil strips 5 at the sides, in which transport holes 7 for a plotter system are stamped.

Figure 3:
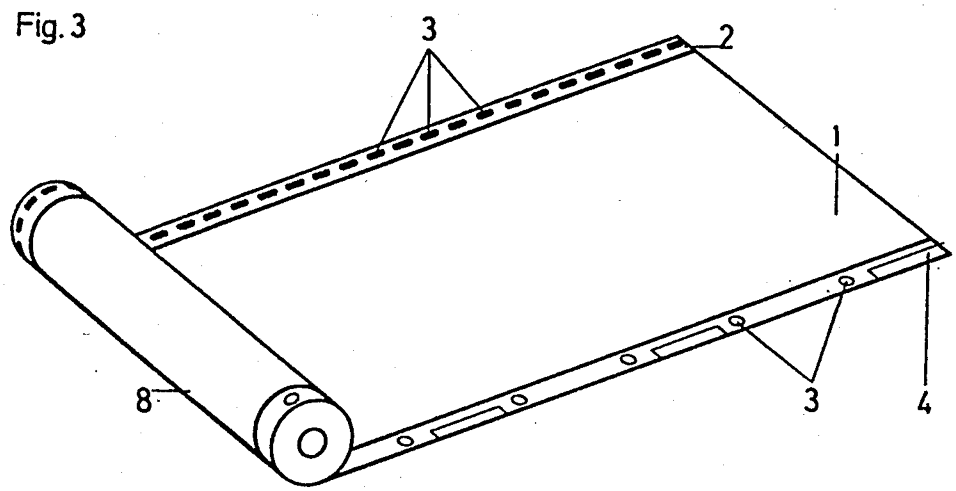
FIG. 3 is a perspective view of a drafting paper in roll form with the plastic foil strip laminated to the longitudinal edges.
Figure 4:
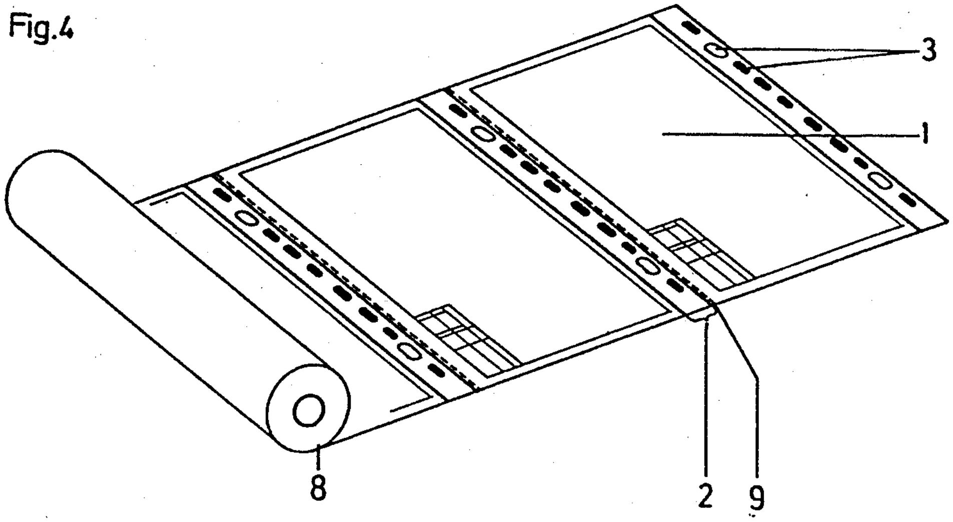
FIG. 4 is a perspective view of a drating paper in roll form, with the plastic foil strip laminated to the sheet transverse to the rolling direction, so that individual sheets can be separated.

At the embodiments according to FIGS. 3 and 4, the drafting or drawing paper is made in the form of a roll 8. In the rolled web according to FIG. 3, the longitudinal edges are laminated with the synthetic or plastic strips 2, which have different holes 3 on opposite sides. In the roll according to FIG. 4, individual drafting or drawing sheets 1 are provided transverse to the rolling direction. The sheets are provided at respective edges adjacent the next sheet with synthetic or plastic foil strips 2 having the holes 3. The rolls are subdivided into individual sheets by a perforation 9 and can be separated from the roll 8 along these perforations.

Preferably, the plastic foil strips 2 and 5 are formed of acetate, polyethylene, polyamide, polycarbonate, polyester, polyfluorethylene, polypropylene, or polyvinylchloride.

The foregoing is a description corresponding in substance to German Application No. G 84 20 427.3, filed July 7, 1984, the International priority of which is being claimed for the instant application, and which is hereby made part of this application. Any material discrepancies between the foregoing specification and the aforementioned corresponding German application are to be resolved in favor of the latter.

I claim:

1. Opaque or transparent drafting paper assembly, comprising a drafting paper sheet having lateral edges and having an upper edge with first holes formed in a given region thereof for hanging said paper sheet in a hanging file system, a first relatively wide synthetic foil strip covering said upper edge, said first synthetic foil strip having expansion joints formed therein and having second holes formed therein alignment with said first holes, second relatively narrow synthetic foil strips covering said lateral edges and having transport holes for a plotter system stamped therein, said first and second synthetic foil strips being applied on said paper sheet by a formed lamination process giving said paper sheet and said foil strips substantially the same combined thickness as said paper sheet alone.

2. Drafting paper assembly according to claim 1, wherein said first foil strip has a region thereon for writing.

3. Drafting paper assembly, according to claim 2 wherein said paper roll has perforations formed therein subdividing said roll into individual sheets.

4. Drafting paper assembly according to claim 1, wherein said paper sheet is part of a paper roll.

5. Drafting paper assembly according to claim 1, wherein said foil strip is formed of a material from the group consisting of acetate, polyethylene, polyamide, polycarbonate, polyester, polyfluorethylene, poly propylene and polyvinylchloride.

* * * * *